(12) United States Patent
Foote et al.

(10) Patent No.: US 9,669,764 B2
(45) Date of Patent: Jun. 6, 2017

(54) VEHICULAR MIRROR REFLECTIVE ELEMENT WITH ELECTROCHROMIC FILM

(71) Applicant: MAGNA MIRRORS OF AMERICA, INC., Holland, MI (US)

(72) Inventors: Keith D. Foote, Grand Rapids, MI (US); Gregory A. Huizen, Hudsonville, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 237 days.

(21) Appl. No.: 14/511,518

(22) Filed: Oct. 10, 2014

(65) Prior Publication Data

US 2015/0103390 A1  Apr. 16, 2015

Related U.S. Application Data

(60) Provisional application No. 61/891,660, filed on Oct. 16, 2013.

(51) Int. Cl.
| | |
|---|---|
| *G02F 1/153* | (2006.01) |
| *G02F 1/03* | (2006.01) |
| *G02F 1/15* | (2006.01) |
| *G09G 3/19* | (2006.01) |
| *B60R 1/08* | (2006.01) |

(Continued)

(52) U.S. Cl.
CPC ............ *B60R 1/088* (2013.01); *G02F 1/155* (2013.01); *G02F 1/157* (2013.01); *G02F 1/161* (2013.01); *G02F 2001/1515* (2013.01)

(58) Field of Classification Search
CPC ...... G02F 1/1523; G02F 1/1533; G02F 1/155; G02F 1/0102; G02F 1/163; G09G 3/16
USPC ................ 359/245–247, 242, 265–275, 277; 345/49, 105, 107; 348/814, 817; 438/929; 349/182–186
See application file for complete search history.

(56) References Cited

U.S. PATENT DOCUMENTS

| | | |
|---|---|---|
| 4,712,879 A | 12/1987 | Lynam et al. |
| 5,066,112 A | 11/1991 | Lynam et al. |

(Continued)

FOREIGN PATENT DOCUMENTS

EP  0612826  8/1994

*Primary Examiner* — Dawayne A Pinkney
(74) *Attorney, Agent, or Firm* — Gardner, Linn, Burkhart & Flory, LLP

(57) ABSTRACT

A mirror reflective element for a rearview mirror assembly for a vehicle includes a glass substrate, an electrochromic film and a mirror reflector. The electrochromic film is provided as a pre-cut mirror shape film and is disposed at the glass substrate. The electrochromic film comprises an electrochromic polymer layer disposed between a front polymeric film and a rear polymeric film. The front polymeric film is disposed between the electrochromic polymer layer and the glass substrate and a transparent electrically conductive coating is disposed between the front polymeric film and the electrochromic polymer layer. An electrically conductive coating is disposed between the rear polymeric film and the electrochromic polymer layer. The polymeric films have respective overhang portions that extend outboard of any other portion of the electrochromic film at respective connecting regions for electrical connection to the electrically conductive coatings.

20 Claims, 6 Drawing Sheets

(51) Int. Cl.
  *G02F 1/157* (2006.01)
  *G02F 1/155* (2006.01)
  *G02F 1/161* (2006.01)

(56) References Cited

U.S. PATENT DOCUMENTS

| | | | |
|---|---|---|---|
| 5,073,012 A | 12/1991 | Lynam | |
| 5,076,673 A | 12/1991 | Lynam et al. | |
| 5,117,346 A | 5/1992 | Gard | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,253,109 A | 10/1993 | O'Farrell et al. | |
| 5,406,414 A | 4/1995 | O'Farrell et al. | |
| 5,525,264 A | 6/1996 | Cronin et al. | |
| 5,555,136 A | 9/1996 | Waldmann et al. | |
| 5,567,360 A | 10/1996 | Varaprasad et al. | |
| 5,582,383 A | 12/1996 | Mertens et al. | |
| 5,610,756 A | 3/1997 | Lynam et al. | |
| 5,668,663 A | 9/1997 | Varaprasad et al. | |
| 5,680,263 A | 10/1997 | Zimmermann et al. | |
| 5,724,187 A * | 3/1998 | Varaprasad | B32B 17/06 359/265 |
| 5,910,854 A | 6/1999 | Varaprasad et al. | |
| 5,984,482 A | 11/1999 | Rumsey et al. | |
| 6,002,544 A | 12/1999 | Yatsu | |
| 6,154,306 A | 11/2000 | Varaprasad et al. | |
| 6,178,034 B1 | 1/2001 | Allemand et al. | |
| 6,227,675 B1 | 5/2001 | Mertens et al. | |
| 6,229,319 B1 | 5/2001 | Johnson | |
| 6,245,262 B1 | 6/2001 | Varaprasad et al. | |
| 6,315,421 B1 | 11/2001 | Apfelbeck et al. | |
| 6,690,268 B2 | 2/2004 | Schofield et al. | |
| 7,179,535 B2 * | 2/2007 | Fisher | B32B 17/10 252/583 |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,360,932 B2 | 4/2008 | Uken et al. | |
| 7,626,749 B2 | 12/2009 | Baur et al. | |
| 7,988,885 B2 | 8/2011 | Percec et al. | |
| 8,049,640 B2 | 11/2011 | Uken et al. | |
| 8,277,059 B2 | 10/2012 | McCabe et al. | |
| 8,287,767 B2 | 10/2012 | Percec et al. | |
| 8,323,534 B2 | 12/2012 | Percec et al. | |
| 8,503,061 B2 | 8/2013 | Uken et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 2006/0061008 A1 | 3/2006 | Karner et al. | |
| 2013/0335800 A1 * | 12/2013 | Konkin | C08G 73/026 359/265 |
| 2014/0022390 A1 | 1/2014 | Blank et al. | |
| 2014/0293169 A1 | 10/2014 | Uken et al. | |

* cited by examiner

VEHICULAR MIRROR REFLECTIVE ELEMENT WITH ELECTROCHROMIC FILM

CROSS REFERENCE TO RELATED APPLICATION

The present application claims the filing benefits of U.S. provisional application Ser. No. 61/891,660 filed Oct. 16, 2013, which is hereby incorporated herein by reference in its entirety.

FIELD OF THE INVENTION

The present invention relates generally to the field of electro-optic reflective elements for rearview mirror assemblies for vehicles and, more particularly, to electrochromic reflective elements for rearview mirror assemblies for vehicles.

BACKGROUND OF THE INVENTION

It is known to provide a mirror assembly that has an electro-optic, such as an electrochromic, reflective element. Such variable reflectance electrochromic reflective elements have an electrochromic medium, such as a solid polymer matrix (SPM) electrochromic or electrochemichromic medium or the like, disposed between two substrates having electrically conductive surfaces opposing and contacting the electrochromic medium.

SUMMARY OF THE INVENTION

The present invention provides an electrically variable reflectance electrochromic (EC) reflective element for a rearview mirror assembly that includes an electrochromic film that varies light transmission through the film in response to a voltage applied thereto. The EC film may be readily formed or cut to the appropriate or selected size and disposed between front and rear glass substrates (or optionally disposed at the rear of a single front glass substrate). Thus, the EC film avoids the vacuum filling process typically used in filling an interpane cavity of an electrochromic mirror cell with electrochromic medium.

The EC film of the mirror reflective element of the present invention thus provides a reduced cost reflective element and provides enhanced process control and may provide reduced failure modes that may occur due to contamination. The mirror reflective element of the present invention may provide a uniform film layer disposed between two glass substrates, or may provide a reduced mass option where the EC film is disposed at the rear of a single glass substrate (with no rear glass substrate mated with the front glass substrate).

These and other objects, advantages, purposes and features of the present invention will become apparent upon review of the following specification in conjunction with the drawings.

DESCRIPTION OF THE PREFERRED EMBODIMENTS

Figure 1:
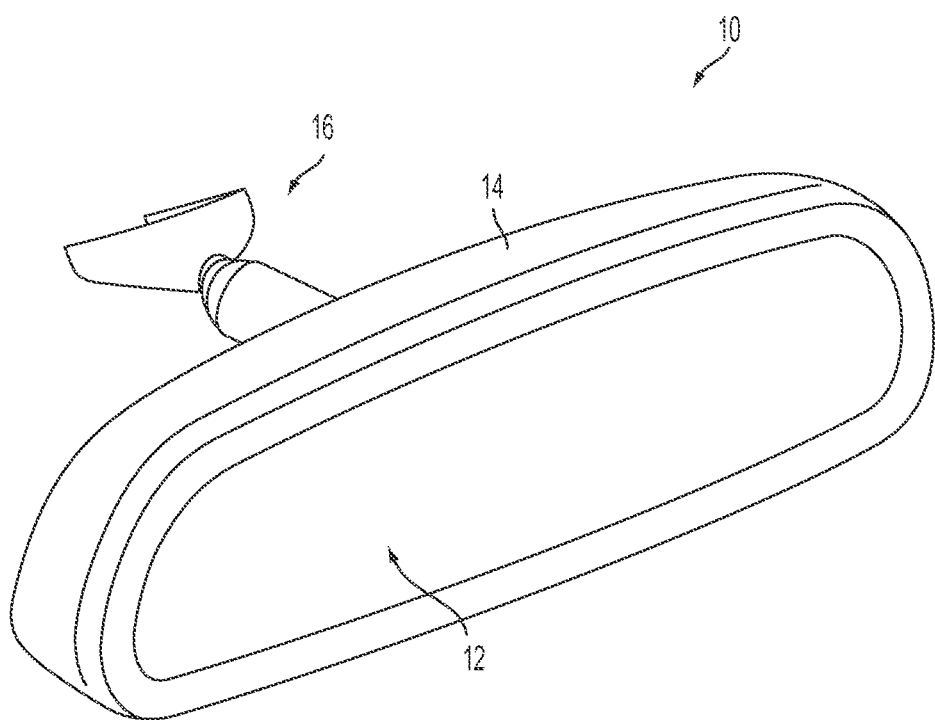
FIG. 1 is a perspective view of an interior rearview mirror assembly having an electrochromic reflective element in accordance with the present invention.

Referring now to the drawings and the illustrative embodiments depicted therein, an interior rearview mirror assembly 10 (FIG. 1) for a vehicle includes a reflective element 12 positioned at a front portion of a mirror housing or casing 14 and a pivot element or mounting element or mounting structure 16 for pivotally attaching or mounting the reflective element 12 (and a mirror backplate attached thereto, such as via an adhesive or tape or the like) at an interior surface of a vehicle (such as to an interior surface of a vehicle windshield or a mirror mounting button at the interior surface of the vehicle windshield, or to a headliner of a vehicle or the like). The reflective element 12 comprises a variable reflectance electrochromic reflective element having an electrochromic film 18 sandwiched between a front glass substrate 20 and a rear glass substrate 22, as discussed below.

Figure 2:
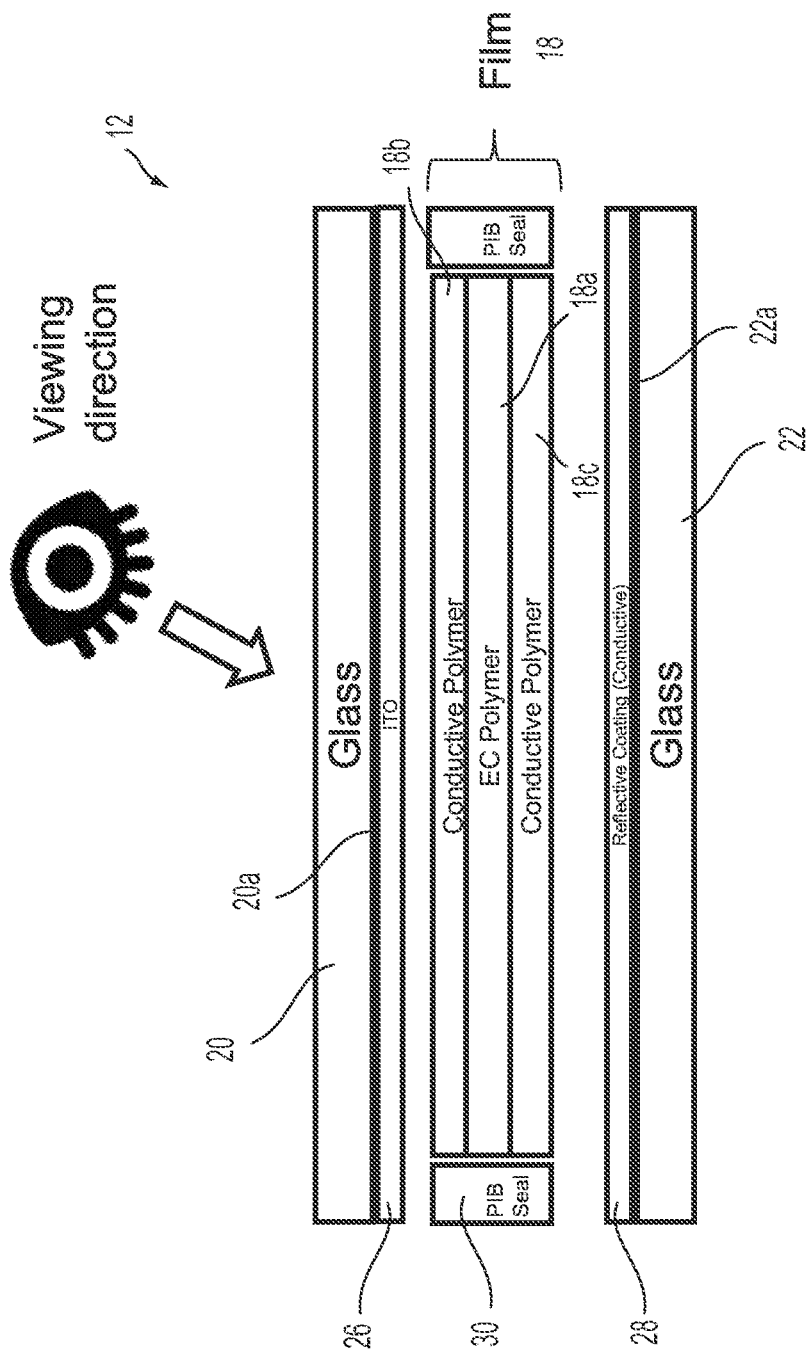
FIG. 2 is an exploded side sectional view of an electrochromic reflective element of the present invention.

In the illustrated embodiment of FIG. 2, the front substrate 20 of the reflective element 12 has a transparent conductive coating or layer 26 (such as an ITO layer or the like) disposed or coated at the rear surface 20a of the front substrate, while the rear glass substrate 22 has a reflective conductive coating 28 disposed or coated at the front surface 22a of the rear substrate 22. The EC film 18 is disposed between and in contact with the conductive coating 26 and the conductive coating 28 and is bounded by a perimeter seal 30 (such as a polyisobutylene (PIB) seal that may be dark or black in color). EC film 18 comprises an EC polymer 18a (such as an EC polymer of the types described in U.S. Pat. Nos. 7,988,885; 8,287,767 and/or 8,323,534, which are hereby incorporated herein by reference in their entireties) that is sandwiched between conductive polymers 18b, 18c, which contact the respective conductive coating 26, 28 when the reflective element is assembled.

Figure 3:
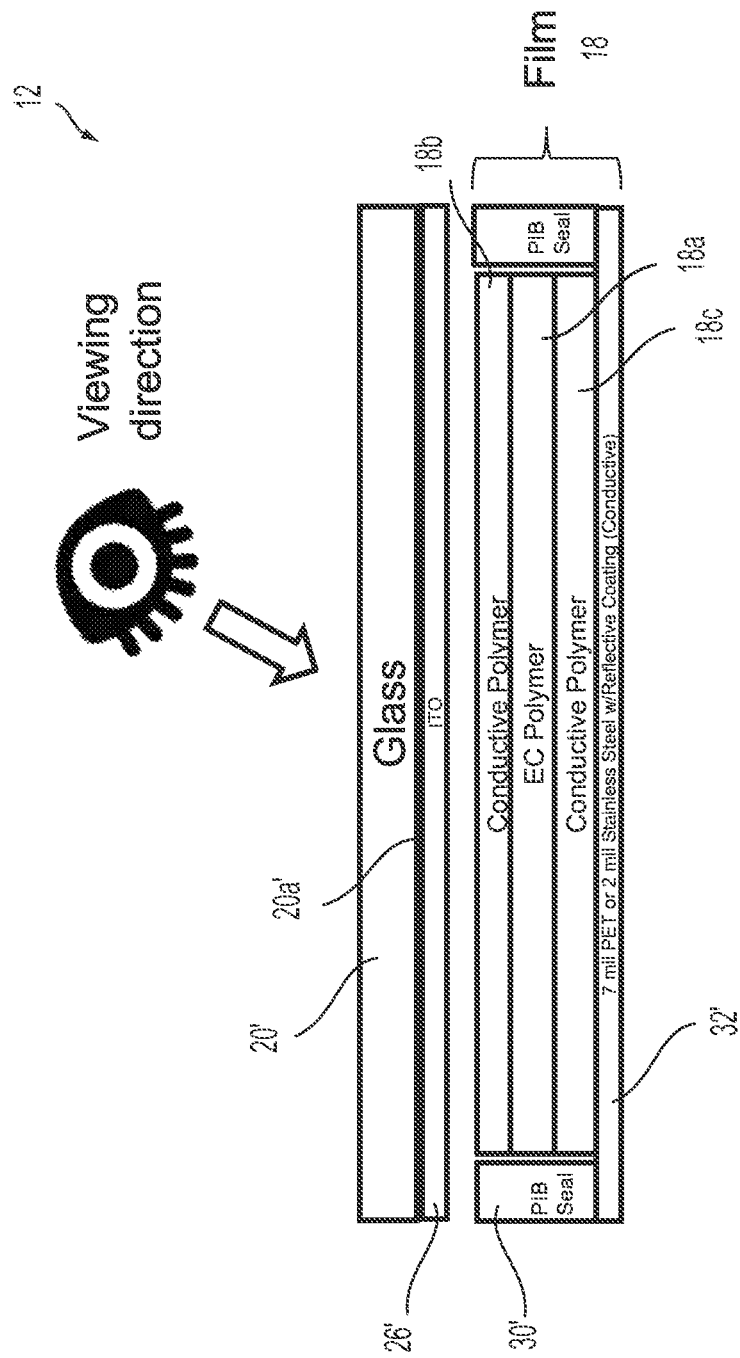
FIG. 3 is an exploded side sectional view of another electrochromic reflective element of the present invention.

Optionally, and as shown in FIG. 3, a mirror reflective element 12' may utilize a single glass substrate 20' with an EC film 18' disposed at the rear surface 20a' of the substrate 20' and bounded by a perimeter seal 30', and with an electrically conductive reflector or reflective coating or layer or element 32' disposed at the rear surface of the EC film 18'. The conductive reflector layer may comprise any suitable electrically conductive and reflective layer or element, and may comprise a non-reflective and/or non-conductive sheet that is coated with a reflective and/or electrically conductive coating. For example, the conductive reflector 32' may comprise a polyethylene terephthalate (PET) sheet or layer, such as, for example, about a 7 mil PET sheet or substrate (or other suitable thickness), with a reflective conductive coating established at a front surface of the PET sheet, or the conductive reflector may comprise a metallic sheet or element or substrate, such as a stainless steel layer or element, such as, for example, a 2 mil stainless steel substrate with a reflective conductive coating established at a front surface of the stainless steel sheet. In the illustrated embodiment, the EC film 18' comprises an EC polymer 18a' (such as an EC polymer of the types described in U.S. Pat. Nos. 5,910,854; 6,154,306; 6,245,262; 7,988,885; 8,287,767 and/or 8,323,534, and/or European Pat. No. EP 0 612 826, which are all hereby incorporated herein by reference in their entireties) that is sandwiched between a conductive polymer 18b', which contacts the conductive coating 26' at the rear surface 20a' of the glass substrate 20' and which contacts the reflector layer or element 32' when the reflective element is assembled. The transparent conductive coating 26' and the reflector element 32' (or the electrically conductive coating established thereon) are electrically powered to darken or dim the EC film 18'. The mirror reflective element 10' thus provides a reduced mass reflective element that does not have a rear glass substrate.

Thus, the mirror reflective element of the present invention may be manufactured by preparing the front and rear glass substrates (or just a front glass substrate for mirror reflective element 10') using current forming and prepping processes (such as, for example, coating the rear surface of the front glass substrate with ITO and coating the front surface of the rear glass substrate with a conductive/reflective coating). The EC film is produced using a roll-to-roll process. The film consists of the EC polymer sandwiched between two conductive polymer layers. The EC film may be cut or otherwise formed to the mirror shape, such as by using a die cut process or the like. The EC film and PIB seal (separate pieces) are placed between the front and rear glass substrates (or the front glass substrate and rear conductive/reflective element or sheet or layer) and the assembly is run through an autoclave process. The autoclave process adheres all the layers to one another and to the glass substrates (or to the front glass substrate and the rear conductive/reflective element or sheet or layer). Electrically conductive elements, such as a conductive epoxy or bus bars or the like, may be applied to the reflective element to provide electrical connection to the EC film, such as by using known processes.

Figure 4:
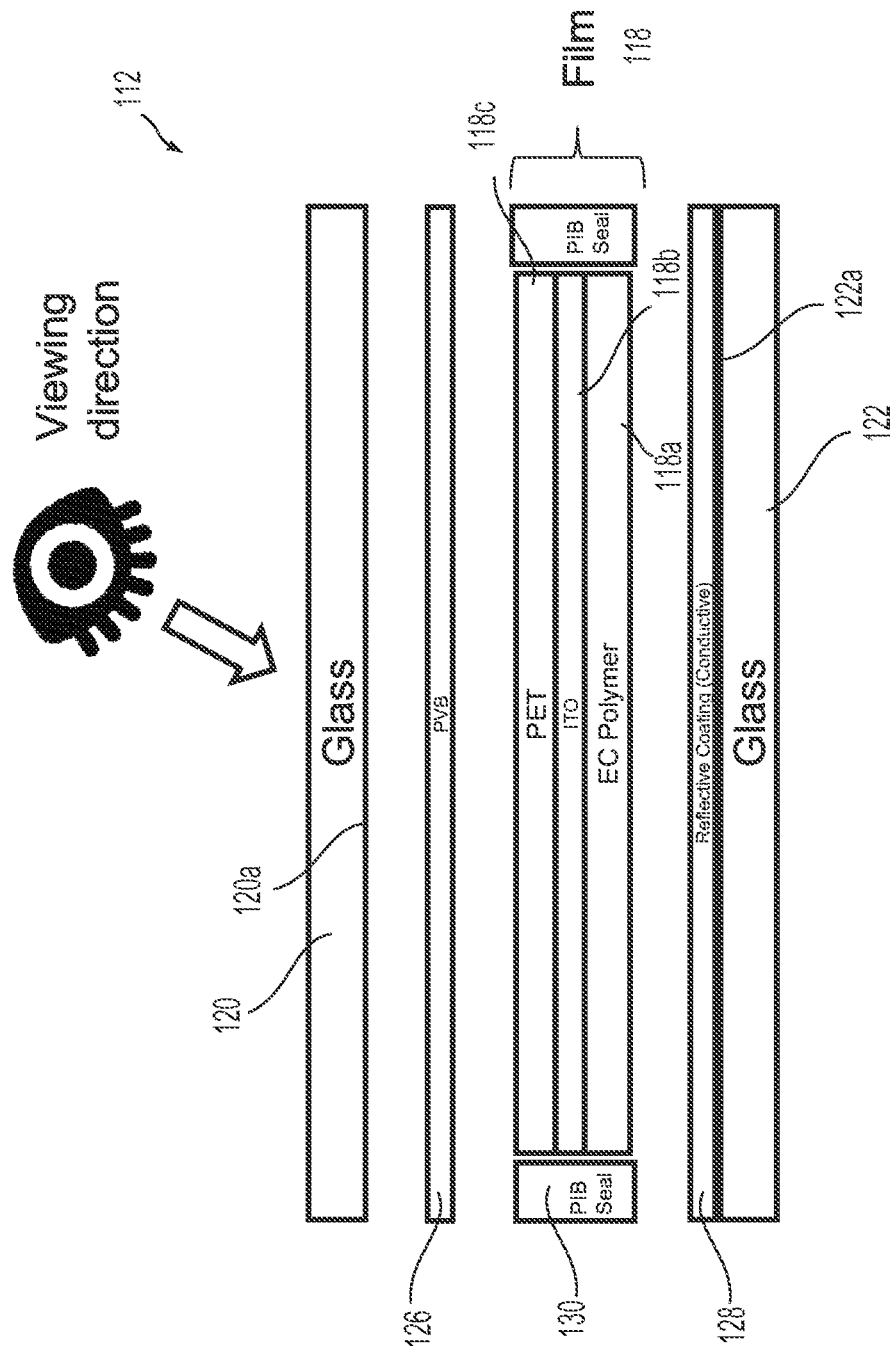
FIG. 4 is an exploded side sectional view of another electrochromic reflective element of the present invention.

Optionally, the EC film may comprise a different construction, such as an EC polymer disposed at a PET layer or the like. For example, and as shown in FIG. 4, a variable reflectance electrochromic reflective element 112 has an electrochromic film 118 sandwiched between a front glass substrate 120 and a rear glass substrate 122. The front substrate 120 of the reflective element 112 has a polyvinyl butyral (PVB) coating or layer 126 (which may comprise a clear or transparent coating or layer) disposed at the rear surface 120a of the front substrate 120, while the rear glass substrate 122 has a reflective conductive coating 128 disposed or coated at the front surface 122a of the rear substrate 122. The EC film 118 is disposed between and in contact with the PVB layer 126 and the reflective conductive coating 128 and is bounded by a perimeter seal 130 (such as a polyisobutylene (PIB) seal that may be dark or black in color). The EC film 118 comprises an EC polymer 118a (such as an EC polymer of the types described in U.S. Pat. Nos. 5,910,854; 6,154,306; 6,245,262; 7,988,885; 8,287,767 and/or 8,323,534, and/or European Pat. No. EP 0 612 826, which are all hereby incorporated herein by reference in their entireties) with a transparent conductive layer 118b (such as ITO or the like) disposed at a surface of the EC polymer, and with a PET layer 118c disposed over the transparent conductive layer 118b (such that the transparent conductive layer 118b is sandwiched between the EC polymer 118a and the PET layer 118c. The transparent conductive layer 118b of the EC film 118 and the reflective conductive coating 128 are electrically powered to dim or darken the EC film.

Figure 5:
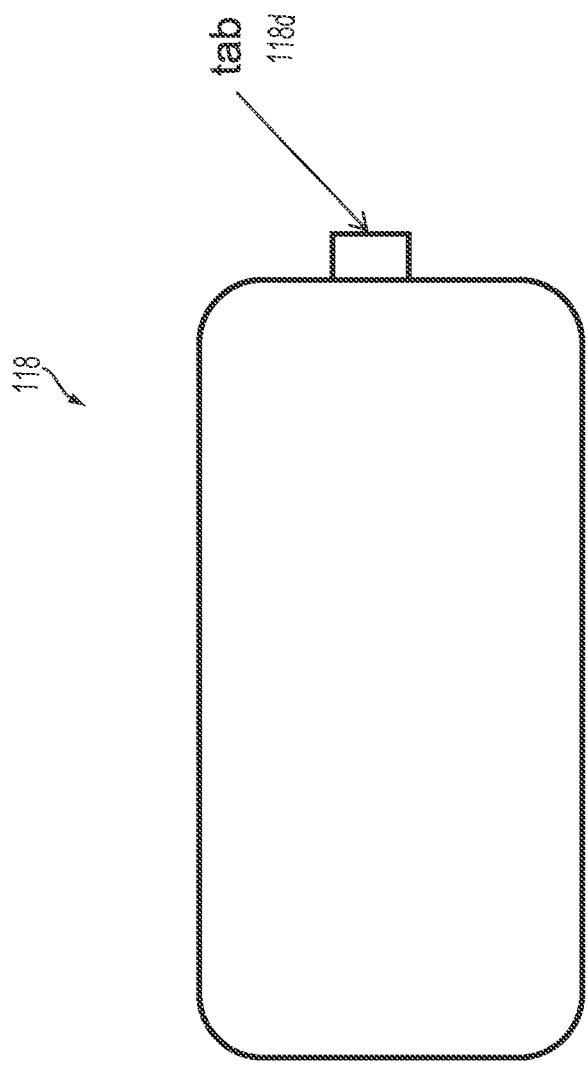
FIG. 5 is a plan view of an electrochromic film for an electrochromic reflective element of the present invention.

The EC film thus includes the electrically conductive layer 118b that is powered during dimming of the reflective element. Thus, a tab or electrical connection is provided at the electrically conductive layer at the perimeter of the EC film so that electrical connection can be established to the layer 118b. For example, and with reference to FIG. 5, a tab 118d may be formed external to the mirror shape or profile of the EC film, whereby the tab may protrude through or outboard of the perimeter seal for electrical connection thereto. The transparent conductive layer may be established or coated onto the EC polymer or PET sheet or layer, whereby the coated element or layer also extends outboard of the perimeter seal with the transparent conductive layer established thereon. For example, the transparent conductive layer may be established or coated onto the EC polymer and the PET layer may be removed at the tab 118d, whereby electrical connection can be readily made to the exposed transparent conductive layer at the tab.

Thus, the mirror reflective element 112 may be manufactured by preparing the rear glass substrate using current forming and prepping processes (such as, for example, coating the front surface of the rear glass substrate with a conductive/reflective coating). However, the front substrate will be prepped without coating the rear surface of the front glass substrate with ITO. The EC Film is produced using a roll-to-roll process. The film consists of the PET layer, the transparent conductive (such as ITO or the like) layer or coating, and the EC polymer. The EC film may be cut or otherwise formed to the mirror shape, such as by using a die cut process or the like. The EC film, the PIB seal, and the PVB sheet or layer (all separate pieces) are placed between the front and rear glass substrates and run through an autoclave process. The autoclave process adheres all the layers or elements to the glass substrates and to one another. Electrically conductive elements, such as a conductive epoxy or bus bars or the like, are applied to the reflective element, such as by using known processes. In order to make electrical connection with the transparent conductive layer of the EC film, a tab is formed so as to be external to the profile (see FIG. 5), and the PET layer may be removed at the tab and electrical connection can be made a the transparent conductive layer of the EC film at the tab that is outboard of the perimeter seal.

Figure 6:
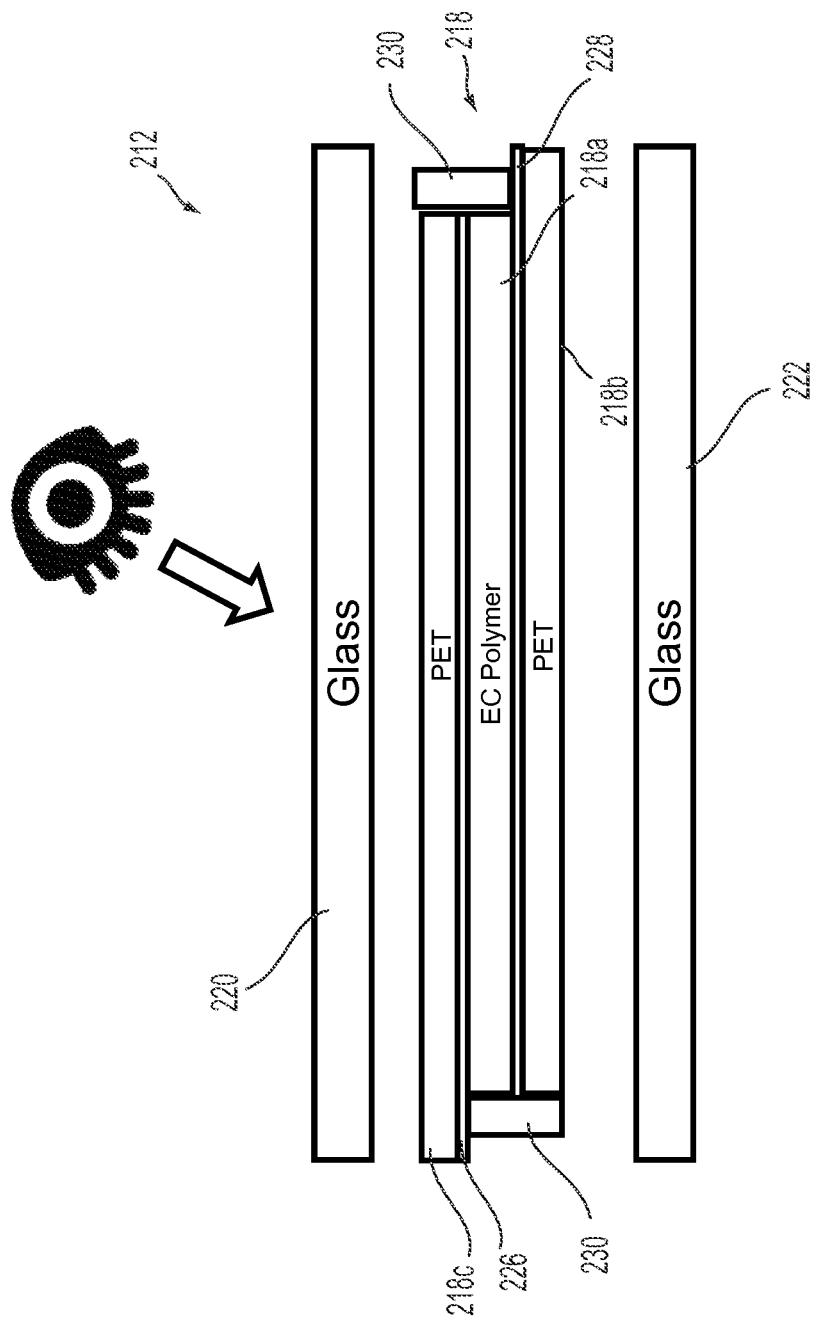
FIG. 6 is an exploded side sectional view of another electrochromic reflective element of the present invention.

Optionally, the EC film may comprise a construction having an EC polymer or EC medium or EC polymer layer disposed between two transparent polymeric layers or films, such as between two PET layers or films or the like. For example, and as shown in FIG. 6, a variable reflectance electrochromic reflective element 212 has an electrochromic film 218 sandwiched between a front glass substrate 220 and a rear glass substrate 222. The EC film 218 includes an EC polymer layer or film 218a (such as an EC polymer or medium of the types discussed above) with a rear polymeric layer 218b, such as a transparent polymeric layer such as a PET layer or the like, disposed at a rear surface of the EC polymer, and with a front transparent polymeric layer 218c, such as a PET layer or the like, disposed at the opposite or front surface of the EC polymer layer (such that the EC polymer layer 218a is sandwiched between the PET layer 218b and the PET layer 218c). The front PET layer 218c has a transparent electrically conductive coating or layer 226 disposed thereat and in electrical conductive contact with the EC polymer layer 218a, while the rear PET layer 218b has an electrically conductive layer 228 (such as a transparent electrically conductive layer or coating or such as a metallic electrically conductive reflector layer or coating or the like) disposed thereat and in electrically conductive contact with the EC polymer layer 218a. Optionally, the EC film 218 may be bounded by a perimeter seal 230 (such as a polyisobutylene (PIB) seal that may be dark or black in color).

The transparent conductive layer 226 (preferably an indium tin oxide layer having a sheet resistance of less than about 20 ohms per square) and the electrically conductive coating 228 of the EC film 218 are electrically powered to dim or darken the EC film. Although shown as being at the inner surface of the front PET layer 218c and at the inner surface of the rear PET layer 218b, the conductive coatings or layers may be established at different surfaces of the PET layers or glass substrate or substrates, depending on the particular application of the EC film and reflective element. The polymeric layers or PET layers 218b, 218c may each have a thickness dimension of at least about 250 microns, preferably at least about 500 microns, or at least about 1000 microns. The transparent polymeric layers are flexible and can flex or bend to allow the films to be provided in rolls of film material, such that the front and rear polymeric films can be unrolled from rolls or reels of film material for forming the EC film. For highly flexible EC films suitable to be maintained on reels, the front and rear polymer film thicknesses may optionally be about 225 microns or less.

The EC film 218 may be formed by laminating the PET layers at the EC polymer medium or layer or film (or otherwise sandwiching the layers together), with the PET layers or films having the respective conductive coatings or layers established thereat. The EC film is formed as a sheet of layers or films, and the appropriate mirror shape may be cut from the sheet to provide the cut mirror shape EC film 218 of the mirror reflective element 212 (the mirror shapes that are cut are dimensioned for the particular shape of the mirror reflective element that will incorporate the cut EC film, and thus are cut and shaped for the particular interior or exterior mirror application). In the illustrated embodiment, the film is cut so as to provide portions of the conductive layers exposed outboard of the perimeter seal 230 (if applicable) or outboard of any other portion of the EC film so that electrical connection can be made to the conductive layers for powering the conductive layers and electrochromically coloring the EC medium to dim the reflective element. For example, the EC film may be formed or cut so that the front PET layer (with transparent conductive coating thereat) has a connecting portion or tab or overhang portion at a perimeter region of the EC film where the front PET layer extends outboard of any other portion of the EC film (such as any other portion of the rear PET layer and the EC polymer layer), while the rear PET layer (with electrically conductive coating thereat) has a connecting portion or tab or overhang portion at another perimeter region of the EC film where the rear PET layer extends outboard of any other portion of the EC film (such as any other portion of the front PET layer and the EC polymer layer). The EC film may be cut or formed via any suitable means, and preferably is cut so that the PET layers protrude from the film at opposite or separate regions of the film.

Optionally, for example, the EC film may be cut via a computer numerical control (CNC) die cutting tool with high precision x, y and z control. Such a CNC tool may cut entirely through the EC film to provide an initial mirror shape. The CNC tool may, at a selected perimeter region of the mirror shape, cut partially through the EC film from one side (such as through the front PET layer 218c and the EC polymer layer 218a), while not cutting through the conductive layer 228 and rear PET layer 218b, leaving a tab or overhang region or portion of the rear PET layer 218b for electrical connection at the conductive layer 228. Likewise, the CNC tool may, at another selected perimeter region of the mirror shape (spaced from the first perimeter region), cut partially through the EC film from the other side (such as through the rear PET layer 218b and the EC polymer layer 218a), while not cutting through the conductive layer 226 and front PET layer 218c, leaving a tab or overhang region or portion of the front PET layer 218c for electrical connection at the conductive layer 226.

The EC film thus includes the electrically conductive layers 226, 228 that are powered during dimming of the reflective element. Thus, the tabs or electrical connections are provided at the electrically conductive layers at the perimeter of the EC film so that electrical connection can be established to the conductive layers. The transparent conductive layer may be established or coated onto the EC polymer layer or the front PET sheet or layer, whereby the coated element or layer extends outboard of the perimeter seal with the transparent conductive layer established thereon. Likewise, the conductive layer may be established or coated onto the EC polymer layer or the rear PET sheet or layer, whereby the coated element or layer extends outboard of the perimeter seal with the conductive layer established thereon. Optionally, the conductive layer 228 may comprise a metallic reflector coating or layer, or may comprise a transparent conductive layer. In applications where the conductive layer 228 comprises a transparent conductive layer, the mirror reflector layer may be established at the rear glass substrate or at the rear or outer surface of the rear PET layer or film.

Thus, the mirror reflective element 212 may be manufactured by preparing the rear glass substrate using current forming and prepping processes (such as, for example, coating the front surface of the rear glass substrate with a conductive/reflective coating). However, the front substrate will be prepped without coating the rear surface of the front glass substrate with ITO. The EC Film is produced using a roll-to-roll process. The film consists of the flexible polymeric or PET layers (optionally coated with the conductive layers) and the EC medium or polymer layer. The EC film may be cut or otherwise formed to the mirror shape, such as by using a die cut process or CNC cutting process or the like. The EC film and optionally a perimeter seal (as separate pieces) may be placed between the front and rear glass substrates and run through an autoclave process. The autoclave process adheres all the layers or elements to the glass substrates and to one another. Electrically conductive elements, such as a conductive epoxy or bus bars or the like, are applied to the reflective element at the respective overhang regions or tabs of the PET layers or films, such as by using known processes.

Therefore, the present invention provides a variable reflectance electrochromic reflective element (such as for an interior rearview mirror assembly or an exterior rearview mirror assembly of a vehicle) that has an EC film laminated at or on at least one glass substrate (or between two glass substrates). The EC film is preferably made using a roll-to-roll process, which may provide for reduced costs and enhanced process controls, and may provide for reduced failure modes due to contamination of the film. The reflective element of the present invention provides a uniform film layer, which provides parallelism for the reflective element having front and rear glass substrates, or provides for reduced mass for the reflective element having only the front glass substrate.

The reflective element 12 and mirror casing 14 are adjustable relative to the base portion of the mounting structure 16 to adjust the driver's rearward field of view when the mirror assembly is normally mounted at or in the vehicle. In the illustrated embodiment, the mounting assembly comprises a single-ball or single-pivot mounting assembly whereby the reflective element and casing are adjustable relative to the vehicle windshield (or other interior portion of the vehicle) about a single pivot joint. Optionally, the mounting assembly may comprise other types of mounting configurations, such as a double-ball or double-pivot mounting configuration or the like, while remaining within the spirit and scope of the present invention. The mounting structure may include a pivot element that is configured to receive a ball member of a base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Pub. No. US-2006-0061008, and/or International Publication No. WO 2010/111173, which are hereby incorporated herein by reference in their entireties).

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500 and/or WO 2013/071070, which are hereby incorporated herein by reference in their entireties (and with electrochromic and prismatic mirrors of such construction are commercially available from the assignee of this application under the trade name INFINITY™ mirror).

In the illustrated embodiment, the interior rearview mirror assembly is designed and constructed as an electrochromic mirror assembly having a front glass substrate, with the front glass substrate of the electrochromic laminate element being constructed with its first surface/outermost perimeter edges slanted or beveled or rounded or the like, such as shown/described in U.S. Des. Pat. Nos. D633,423; D633,019; D638,761 and/or D647,017, and/or International Publication Nos. WO 2012/051500; WO 2010/124064; WO 2011/044312 and/or WO 2013/071070, which are hereby incorporated herein by reference in their entireties, in order to obviate/avoid a sharp edge at the front or outermost perimeter surface of the mirror reflective element and mirror assembly that could potentially hurt/injure an occupant of a vehicle equipped with the interior rearview mirror assembly during an accident. The mirror casing 12 may comprise any suitable mirror casing, and may comprise a plastic or polymeric molded casing or housing.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication No. WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 13/023,750, filed Feb. 9, 2011, and/or U.S. Pub. Nos. US-2006-0061008; US-2006-0050018; US-2009-0015736; US-2009-0015736 and/or US-2010-0097469, and/or PCT Application No. PCT/US10/47256, filed Aug. 31, 2010, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pub. Nos. US-2006-0171704; US-2009-0244361 and/or US-2010-0214791, and/or International Publication Nos. WO 2009/046268 and/or WO 2009/036176, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131, 154; 5,255,442; 5,632,092 and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274, 501; 7,255,451; 7,195,381; 7,184,190; 6,690,268; 5,140, 455; 5,151,816; 6,178,034; 6,154,306; 6,002,544; 5,567, 360; 5,525,264; 5,610,756; 5,406,414; 5,253,109; 5,076, 673; 5,073,012; 5,117,346; 5,724,187; 5,668,663; 5,910, 854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties, and/or as described in U.S. Pat. No. 7,195,381, which is hereby incorporated herein by reference in its entirety. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pub. Nos. US-2006-0061008 and/or US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Pub. No. US-2006-0050018, which are hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A mirror reflective element for a rearview mirror assembly for a vehicle, said mirror reflective element comprising:
   a glass substrate;
   an electrochromic film provided as a pre-cut mirror shape, wherein said electrochromic film is disposed at said glass substrate;
   wherein said electrochromic film comprises an electrochromic polymer layer that provides a variable transmission of light in response to a voltage applied thereto;
   wherein said electrochromic polymer layer is disposed between a front polymeric film and a rear polymeric film, wherein said front polymeric film is flexible and has a thickness dimension of at least about 250 microns and wherein said rear polymeric film is flexible and has a thickness dimension of at least about 250 microns;
   wherein said front polymeric film is disposed between said electrochromic polymer layer and said glass substrate and wherein a transparent electrically conductive coating is disposed between said front polymeric film and said electrochromic polymer layer, said transparent electrically conductive coating being in electrical conductive contact with said electrochromic polymer layer;
   wherein an electrically conductive coating is disposed between said rear polymeric film and said electrochromic polymer layer, said electrically conductive coating being in electrical conductive contact with said electrochromic polymer layer;
   wherein said front polymeric film of said pre-cut mirror shape has a front overhang portion that extends outboard of any portion of said rear polymeric film and said electrochromic polymer layer at a first connecting region of said mirror reflective element for electrical connection to said transparent electrically conductive coating outboard of said perimeter seal;
   wherein said rear polymeric film of said pre-cut mirror shape has a rear overhang portion that extends outboard of any portion of said front polymeric film and said electrochromic polymer layer at a second connecting region of said mirror reflective element for electrical connection to said electrically conductive coating outboard of said perimeter seal; and
   a mirror reflector disposed rearward of said electrochromic polymer layer, wherein said mirror reflector is at least partially reflective.

2. The mirror reflective element of claim 1, comprising a rear glass substrate, wherein said rear polymeric film is disposed between said electrochromic polymer layer and said rear glass substrate and wherein said electrochromic film is disposed between said glass substrate and said rear glass substrate.

3. The mirror reflective element of claim 1, wherein said electrically conductive layer comprises said mirror reflector.

4. The mirror reflective element of claim 1, wherein said front and rear polymeric films comprise conductive polymer layers.

5. The mirror reflective element of claim 1, wherein said front and rear polymeric films comprise polyethylene terephthalate.

6. The mirror reflective element of claim 5, wherein a polyvinyl butyral layer is disposed between said front polymeric film and said glass substrate.

7. The mirror reflective element of claim 1, wherein said mirror reflector is disposed at a thin substrate at the rear of said mirror reflective element.

8. The mirror reflective element of claim 7, wherein said thin substrate comprises one of (i) a polymeric material and (ii) a metallic material.

9. The mirror reflective element of claim 1, wherein said mirror reflective element comprises a reflective element for an interior rearview mirror assembly of a vehicle.

10. The mirror reflective element of claim 1, wherein said mirror reflective element comprises a reflective element for an exterior rearview mirror assembly of a vehicle.

11. The mirror reflective element of claim 1, wherein said mirror shape of said electrochromic film is cut from a larger sheet of film.

12. The mirror reflective element of claim 11, wherein the larger sheet of film is formed via a roll-to-roll process.

13. The mirror reflective element of claim 11, wherein said electrochromic film is cut partially through at said overhang portions.

14. The mirror reflective element of claim 1, wherein said electrochromic film is adhered at said glass substrate via an autoclave process.

15. The mirror reflective element of claim 1, comprising a perimeter seal disposed around the periphery of said electrochromic film, with said front and rear overhang portions extending outboard of said perimeter seal at the respective first and second connecting regions.

16. A mirror reflective element for a rearview mirror assembly for a vehicle, said mirror reflective element comprising:
   a front glass substrate;
   a rear glass substrate;
   an electrochromic film provided as a pre-cut mirror shape, wherein said electrochromic film is disposed between said front glass substrate and said rear glass substrate;
   wherein said electrochromic film comprises an electrochromic polymer layer that provides a variable transmission of light in response to a voltage applied thereto;
   wherein said electrochromic polymer layer is disposed between a front polymeric film and a rear polymeric film, wherein said front polymeric film is flexible and has a thickness dimension of at least about 250 microns and wherein said rear polymeric film is flexible and has a thickness dimension of at least about 250 microns;
   wherein said front polymeric film is disposed between said electrochromic polymer layer and said front glass substrate and wherein a transparent electrically conductive coating is disposed between said front polymeric film and said electrochromic polymer layer, said transparent electrically conductive coating being in electrical conductive contact with said electrochromic polymer layer;
   wherein said rear polymeric film is disposed between said electrochromic polymer layer and said rear glass substrate and wherein an electrically conductive coating is disposed between said rear polymeric film and said electrochromic polymer layer, said electrically conductive coating being in electrical conductive contact with said electrochromic polymer layer;
   wherein said front polymeric film of said pre-cut mirror shape has a front overhang portion that extends outboard of any portion of said rear polymeric film and said electrochromic polymer layer at a first connecting region of said mirror reflective element for electrical connection to said transparent electrically conductive coating outboard of said perimeter seal;
   wherein said rear polymeric film of said pre-cut mirror shape has a rear overhang portion that extends outboard of any portion of said front polymeric film and said electrochromic polymer layer at a second connecting region of said mirror reflective element for electrical connection to said electrically conductive coating outboard of said perimeter seal; and
   wherein said electrically conductive layer at said rear polymeric layer is at least partially reflective.

17. The mirror reflective element of claim 16, wherein said mirror shape of said electrochromic film is cut from a larger sheet of film, and wherein the larger sheet of film is formed via a roll-to-roll process, and wherein said electrochromic film is cut partially through at said overhang portions.

18. A mirror reflective element for a rearview mirror assembly for a vehicle, said mirror reflective element comprising:
   a glass substrate;
   an electrochromic film provided as a pre-cut mirror shape, wherein said electrochromic film is disposed at said glass substrate;
   a perimeter seal disposed around the periphery of said electrochromic film;
   wherein said electrochromic film comprises an electrochromic polymer layer that provides a variable transmission of light in response to a voltage applied thereto;
   wherein said electrochromic polymer layer is disposed between a front polymeric film and a rear polymeric film, wherein said front polymeric film is flexible and has a thickness dimension of at least about 250 microns and wherein said rear polymeric film is flexible and has a thickness dimension of at least about 250 microns;
   wherein said front polymeric film is disposed between said electrochromic polymer layer and said glass substrate and wherein a transparent electrically conductive coating is disposed between said front polymeric film and said electrochromic polymer layer, said transparent electrically conductive coating being in electrical conductive contact with said electrochromic polymer layer;
   wherein an electrically conductive coating is disposed between said rear polymeric film and said electrochromic polymer layer, said electrically conductive coating being in electrical conductive contact with said electrochromic polymer layer;
   wherein said front polymeric film of said pre-cut mirror shape has a front overhang portion that extends outboard of any portion of said rear polymeric film and said electrochromic polymer layer and said perimeter seal at a first connecting region of said mirror reflective element for electrical connection to said transparent electrically conductive coating outboard of said perimeter seal;
   wherein said rear polymeric film of said pre-cut mirror shape has a rear overhang portion that extends outboard of any portion of said front polymeric film and said electrochromic polymer layer and said perimeter seal at a second connecting region of said mirror reflective element for electrical connection to said electrically conductive coating outboard of said perimeter seal;
   wherein said mirror shape of said electrochromic film is cut from a larger sheet of film, and wherein the larger sheet of film is formed via a roll-to-roll process, and wherein said electrochromic film is cut partially through at said overhang portions; and a mirror reflector disposed rearward of said electrochromic polymer layer, wherein said mirror reflector is at least partially reflective.

19. The mirror reflective element of claim 18, comprising a rear glass substrate, wherein said rear polymeric film is disposed between said electrochromic polymer layer and said rear glass substrate and wherein said electrochromic film is disposed between said glass substrate and said rear glass substrate.

20. The mirror reflective element of claim 18, wherein said electrically conductive layer comprises said mirror reflector.

\* \* \* \* \*